W. GALE.

Straw Cutter.

Reissued May 4, 1869.

No. 3,416.

N. PETERS, Photo-Lithographer, Washington, D. C.

United States Patent Office.

WARREN GALE, OF PEEKSKILL, NEW YORK.

*Letters Patent No.* 10,592, *dated March* 7, 1854; *reissue No.* 2,293, *dated June* 26, 1866; *extended seven years from March* 7, 1868; *reissue No.* 3,416, *dated May* 4, 1869.

IMPROVEMENT IN STRAW-CUTTERS.

The Schedule referred to in these Letters Patent and making part of the same.

*To all whom it may concern:*

Be it known that I, WARREN GALE, of Peekskill, in the county of Westchester, and State of New York, have invented certain new and useful Improvements in Straw-Cutters; and I do hereby declare that the following is a full, clear, and exact description thereof, reference being had to the accompanying drawings, and to the letters of reference marked thereon, which form a part of this specification, and in which—

Figure 1:
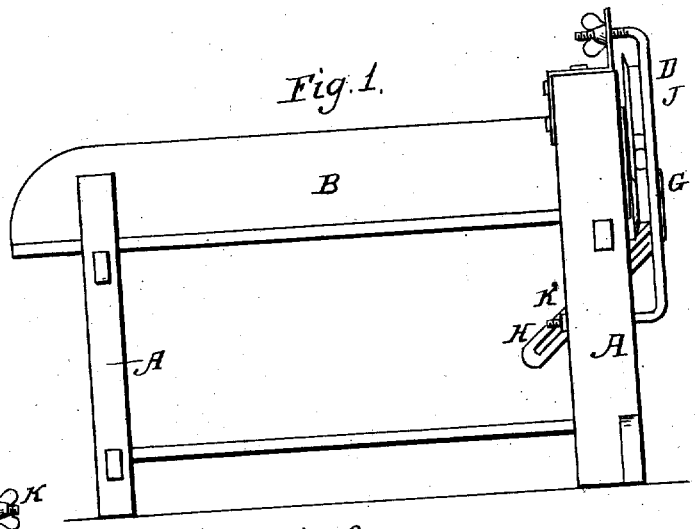
Figure 2:
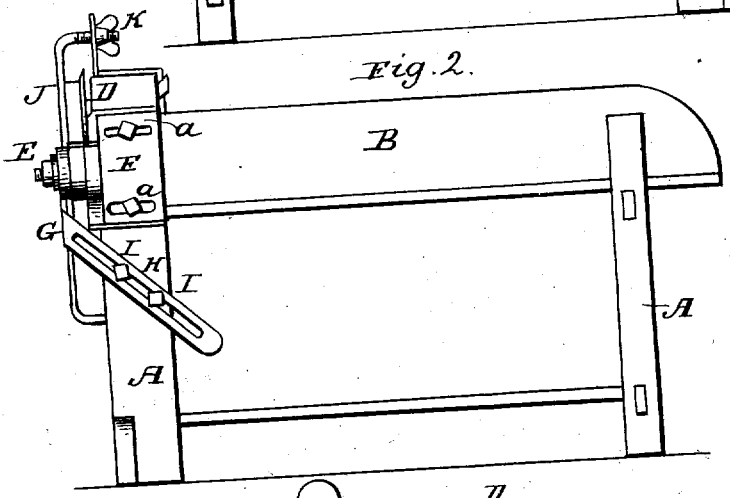

Figure 1 represents a rear-side view of my hay, straw, and stalk-cutter;

Figure 2, an off-side view of the same; and

Figure 3:
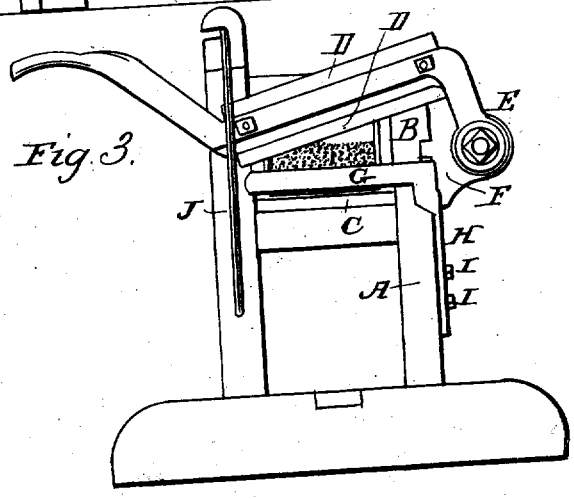

Figure 3, an end view thereof.

Similar letters indicate like parts in all the figures.

My improvements belong to the hand-lever cutters, there being the usual cutting-box, B, mounted on a suitable frame, A.

At the cutting-end of the box is a mouth-piece, C, with a cutting-edge, generally made of cast-iron, and this serves for the fixed or stationary knife, in connection with which the moving knife D cuts the hay, straw, or stalk, similar to shears.

My first improvement consists in the employment of a pivot, capable of adjustment, for the moving knife to work on, the pivot being provided with a flanch, or its equivalent, for attaching it to the cutting-machine, so that, in the process of construction, or to compensate for wear, the moving knife may be adjusted to, and kept in the proper relation to the fixed knife.

The pivot, on which the knife moves, besides furnishing the easiest, simplest, and most complete means of adjustment, also enables the knife to be constantly held close to its guide-shoulder, by the counter-surface washer and screw-nut E, and having once worn the surfaces of the contact smooth and regular, they are never disturbed, as they would necessarily be, if the adjustment of the knife itself were effected by the shoulders and washers. And the knife may be removed from the machine, with its pivots, in transporting the implement, so that the connection need never be disturbed from any cause. Thus it will be seen that, by means of the flanched pivot, the moving knife and pivot may be attached and detached from the machine, or readily adjusted to the fixed knife, without disturbing the relation of the working-parts of the pivot, a much more desirable way than when the knife-handle is merely moved on the pivot, presenting new wearing-surfaces.

The pivot is fastened to and made adjustable on the machine, by means of two slots, and suitable bolts, or their equivalent. This pivot, it will be seen, is complete of itself, when used in combination with any suitable knife-handle, for a lever feed-cutter.

My improvement further consists in the shape of the knife-handle. The pivot-end of the handle is bent so as to raise the heel-portion of the knife. By this arrangement, the outer end of the knife commences the cut while it is finished at or near the pivot, and making a drawing shear-cut.

To avoid stooping in the operation, I make the helve-portion of the handle, or that portion next to the outer end of the knife, with an upward bend, and completing the handle by making another bend downward, or partially downward, at that portion of the helve to be grasped by the hand of the operator. This latter bend should be of sufficient length to form a complete handle for the hand to grasp. This form of handle enables me to use a straight knife, which is cheaper made, easier ground, and quite as efficient as a curved one.

It will be seen this mode of constructing the knife-handle is useful even in connection with a curved knife, and is complete of itself, and may or may not be used in connection with my other improvements.

I am aware that metal knife-handles have been heretofore made, embracing some of the features embraced in mine, but it is all these features combined in one handle that constitutes this part of my invention, to wit, the bent portion at the heel-end of the knife, the other bend at the helve-portion, with a bend forming the portion to be grasped by the hand.

The knife-blade extends up above the handle some distance, and serves to assist the volume of feed being pushed in, and prevent it being pushed over the knife-handle.

This method of constructing that part of the handle is useful in any handle of a lever feed-cutter, being pivoted at one end, and worked by the hand at the other end, without regard to my other improvements in the handle.

My improvement further consists in the arrangement of an adjustable gauge-plate, G, in front of the fixed knife, in such a manner that it shall be raised above said fixed knife, in proportion to the distance it is adjusted outward from it, to give a larger cut, and *vice versa.* This is accomplished by providing the shank H of the gauge, which is bent at right angles to the plane of the gauge, with a longitudinal slot, through which tightening-bolts I I pass, for adjusting the position of the gauge.

When the length of the cut is diminished, the tendency of the straw or stalks is to jam between the gauge and the fixed knife, so that the gauge has to be set low, and let a considerable portion of the straw or stalk fall over the same. But when the distance of the gauge from the fixed knife is increased, for a longer cut, the tendency to jam between it and the fixed knife is diminished, so that it can be set higher, and let more of the straw, hay, or stalks fall between the same and knife, so as to render the gauging more effectual and certain.

Having thus fully described my invention,

What I claim, and desire to secure by Letters Patent, is—

1. The pivot E, provided with a flanch, for fastening the pivot to the machine, in combination with a moving knife of a feed-cutter.

2. The fixed pivot F, on which the moving knife works, provided with a flanch, for fastening to the machine, and made adjustable thereon, by means of slots *a a*, or their equivalent, substantially as described.

3. A knife-handle, to which the knife is directly attached, constructed with a bend at or near the pivot-end, and with an upward bend of that part next to the outer end of the knife, and with a further bend downward at that part of the helve to be grasped by the hand, substantially as described.

4. The pivot E, provided with a flanch, for fastening the pivot to the machine, in combination with the bent handle, substantially as described.

5. The bent handle, in combination with the movable knife, substantially as described.

6. Also, the arrangement of the adjustable gauge-plate G, in front of the fixed knife, in such a manner that it shall be raised above the fixed knife, in proportion to the increased distance at which it is adjusted away from the knife, to give a longer cut, and *vice versa*, substantially as herein set forth.

7. A chopping-handle, to which the knife is attached, hung or pivoted at one end, and with an upward bend, or curve at that end, and with another curve at the end to be grasped by the hand, when this handle is provided with a flange, or projection on its back part, formed by the extension of the knife, to aid in preventing the uncut feed from being pushed over the handle, substantially as described.

WARREN GALE.

Witnesses:
G. E. HUTCHINSON,
G. A. FERGUSON.